(12) United States Patent
Ajanovic

(10) Patent No.: US 8,992,114 B2
(45) Date of Patent: Mar. 31, 2015

(54) CONNECTOR ASSEMBLY

(75) Inventor: Alosman Ajanovic, Forest Lake (AU)

(73) Assignee: Boseth Pty Ltd, Tarragindi (AU)

( * ) Notice: Subject to any disclaimer, the term of this patent is extended or adjusted under 35 U.S.C. 154(b) by 0 days.

(21) Appl. No.: 12/865,301

(22) PCT Filed: Jan. 30, 2009

(86) PCT No.: PCT/AU2009/000107
§ 371 (c)(1),
(2), (4) Date: Jul. 29, 2010

(87) PCT Pub. No.: WO2009/094720
PCT Pub. Date: Aug. 6, 2009

(65) Prior Publication Data
US 2011/0008127 A1    Jan. 13, 2011

(30) Foreign Application Priority Data

Jan. 30, 2008    (AU) ................................ 2008200436

(51) Int. Cl.
*F16B 35/04*    (2006.01)
*F16B 12/20*    (2006.01)
(52) U.S. Cl.
CPC ............ *F16B 12/2063* (2013.01); *Y10S 403/12* (2013.01)
USPC ..................... 403/362; 403/231; 403/DIG. 12
(58) Field of Classification Search
USPC .................. 403/231, 362, DIG. 10–DIG. 13; 52/285.2, 285.4
See application file for complete search history.

(56) References Cited

U.S. PATENT DOCUMENTS

| 2,305,063 | A | * | 12/1942 | Collins | ................................ 5/296 |
| 2,442,184 | A | * | 5/1948 | Summers | ..................... 52/584.1 |
| 2,540,468 | A | * | 2/1951 | Anderson | ..................... 52/584.1 |
| 3,022,084 | A | * | 2/1962 | Dresback | ........................ 279/83 |
| 4,045,927 | A | * | 9/1977 | Diaz | .......................... 52/127.11 |
| 4,116,573 | A | * | 9/1978 | Fuchs | ............................ 403/264 |
| 4,299,067 | A | * | 11/1981 | Bertschi | ..................... 52/127.12 |
| 4,405,253 | A | * | 9/1983 | Stockum | ....................... 403/231 |
| 4,784,554 | A |   | 11/1988 | Break | |

(Continued)

FOREIGN PATENT DOCUMENTS

DE    2701871 A1    7/1978
DE    2959297       6/1981

(Continued)

OTHER PUBLICATIONS

International Preliminary Report on Patentability, PCT/AU2009/000107, issued Feb. 8, 2010 by IPEA/AU, Australian Patent Office.

(Continued)

*Primary Examiner* — Joshua Kennedy
(74) *Attorney, Agent, or Firm* — Patterson + Sheridan, LLP

(57) ABSTRACT

A connector assembly to fasten two members including an elongate fastener with a transverse aperture where the transverse aperture has a countersunk surface and a screw threaded nipple positionable in the transverse aperture so that when the nipple is placed into the transverse aperture it moves down the countersunk surface and forces the fastener to move and bring the two fastened members closer together. The connector assembly can also include a housing to assist with the positioning of the nipple. The connector assembly has relatively few parts and provides a tight and aesthetically pleasing connection finish.

8 Claims, 8 Drawing Sheets

(56) References Cited

U.S. PATENT DOCUMENTS

| | | | | |
|---|---|---|---|---|
| 5,468,102 | A * | 11/1995 | Stojanovski | 409/234 |
| 5,749,788 | A | 5/1998 | Bourque | |
| 6,299,394 | B1 * | 10/2001 | Stojanovski | 409/234 |
| 6,644,152 | B1 * | 11/2003 | Stojanovski | 82/158 |
| 7,281,888 | B1 * | 10/2007 | Kaiser et al. | 409/234 |
| 7,473,082 | B2 * | 1/2009 | Marielle | 418/48 |

FOREIGN PATENT DOCUMENTS

| | | |
|---|---|---|
| DE | 20020200 U1 | 4/2001 |
| DE | 10318652 B3 | 12/2004 |
| FR | 13331299 | 6/1963 |
| FR | 2106883 | 5/1972 |
| FR | 2267472 A1 | 11/1975 |
| FR | 2517386 A1 | 6/1983 |
| GB | 242501 A | 11/1925 |
| GB | 420551 A | 12/1934 |
| GB | 1488083 A | 10/1977 |
| GB | 2049093 A | 12/1980 |
| GB | 2201217 A | 8/1988 |

OTHER PUBLICATIONS

International Search Report, PCT/AU2009/000107 mailed May 1, 2009 by ISA/AU, Australian Patent Office.

Written Opinion of the International Searching Authority, PCT/AU2009/000107 mailed May 1, 2009 by ISA/AU, Australian Patent Office.

Anderson, Bill, "Response to Written Opinion of the International Searching Authority", Dec. 24, 2009, p. 1, Ahearn Fox, Queensland 4000, Australia.

Extended European Search Report, European Application 09705148.6 dated Aug. 1, 2011.

First Office Action for Application No. 200980104023.4 Ajanovic, Alosman; Gebeyehu, Jeantife; State Intellectual Property Office of the People's Republic of China with translation, issued May 18, 2011.

Text portion of First Office Action for Application No. 200980104023.4 Ajanovic, Alosman; Gebeyehu, Jeantife; State Intellectual Property Office of the People's Republic of China with translation, issued May 18, 2011.

Response to Australian Patent Examination Report No. 1 dated Dec. 7, 2012.

Record of Acceptance of Australian parent application.

Australian Patent Examination Report No. 1, dated Nov. 19, 2012.

Third Office Action for Application No. 200980104023.4 Ajanovic, Alosman; Gebeyehu, Jeantife; State Intellectual Property Office of the People's Republic of China with translation, issued Jan. 22, 2013.

English Summary of Text portion of Third Office Action for Application No. 200980104023.4 Ajanovic, Alosman; Gebeyehu, Jeantife; State Intellectual Property Office of the People's Republic of China with translation, issued May 18, 2011.

* cited by examiner

CONNECTOR ASSEMBLY

The present application is the national phase application corresponding to International Application PCT No. PCT/CN2009/000107, filed Jan. 30, 2009 and amended on Dec. 24, 2009, which claims priority to Australian Application No. 2008200436, filed on Jan. 30, 2008; both applications are hereby incorporated by reference.

FIELD OF INVENTION

The present invention relates to fasteners and fastening assemblies for furniture, bench tops, cabinets, beams and the like. Reference will be made in the specification to connecting furniture parts and bench tops but this is by way of example only and the invention is not limited to these examples.

BACKGROUND OF THE INVENTION

Connecting two different furniture parts is often difficult as nails and screws do not provide a clean and aesthetically pleasing finish. Furthermore there is often a small gap or space between the two furniture parts and it is difficult to obtain an abutting connection.

OBJECT OF THE INVENTION

It is an object of the present invention to provide an alternative connector assembly that overcomes one or more of the above mentioned problems.

SUMMARY OF THE INVENTION

In one aspect the invention broadly resides in a connector assembly to fasten two members, one of said members having a shaped end, the connector including an elongate fastener with an end for insertion into one of the members and a transverse aperture formed at a predetermined spacing from said end, said transverse aperture has at least one countersunk surface with an apex substantially aligned coaxially with said transverse aperture;

a grub screw insertable into the other member along a transverse axis substantially at said predetermined spacing from the shaped end;

a nipple formed onto one end of the grub screw wherein the nipple may be placed into the transverse aperture for movement down the countersunk surface towards the apex thereof and whereby the fastener moves with respect to the other member and brings the two fastened members closer together.

Preferably the nipple is screw threaded.

The fastener preferably has a screw threaded end.

The counter sunk surface of the transverse aperture is preferably shaped to allow the nipple to slide downward further into the transverse aperture. The side of the transverse aperture is preferably shaped at a downward incline from the periphery towards the center of the aperture.

In one embodiment there is a housing for the positioning of the nipple into the transverse aperture of the fastener. The housing preferably has opposing apertures in the side of the housing to allow the fastener to pass there through.

In another embodiment the connector assembly includes one or more brackets that serve to maintain the position of the member without being dislodged or withdrawn. The one or more brackets are preferably curved plates.

In another aspect the invention broadly resides in a connector assembly for connecting a first member to a second member, the second member has a preformed cavity and a preformed aperture, the preformed aperture is positioned substantially at 90 degrees to the preformed cavity and opens to the preformed cavity, the connector assembly including an elongate fastener with a first end fixable to the first member and a second end positionable in the preformed cavity of the second member, the second end has a fastener aperture with a countersunk peripheral surface on at least one side; and a screw threaded nipple that is positionable in the preformed aperture of the second member and beatable in the fastener aperture wherein in use the second end of the fastener is positioned in the preformed cavity with the fastener aperture with the countersunk peripheral surface aligned with the preformed aperture so that the countersunk peripheral surface is exposed through the preformed aperture and is contacted when the nipple is screwed and as the nipple moves down the countersunk surface to substantially center the nipple in the fastener aperture and the elongate fastener and hence the first member moves closer to the second member.

The first and second members may be furniture parts, cabinet parts and the like and can be made of wood; particle board, paper board, chip board, honeycomb board and the like; and plastic.

Preferably the fastener is positioned so that a portion of the countersunk peripheral surface that is distal to the first member is exposed through the preformed aperture and is contacted when the nipple is screwed into the fastener.

Preferably, the elongate fastener is a screw threaded fastener and the first end has a screw thread.

The second end of the elongate fastener preferably has a countersunk surface about the periphery of the fastener aperture on both sides of the elongate fastener.

The fastener aperture preferably has a narrowed portion formed by opposing peripheral countersunk surfaces of the fastener aperture and that spaces apart the two countersunk surfaces.

Preferably, the second end of the elongate fastener has a fastener cavity for accommodating a screw driver head or an Allen key.

In one embodiment, the elongate fastener is a one-part fastener wherein the first end is integrally formed with the second end.

In another embodiment, the elongate fastener is a two-part fastener wherein the first end is formed by a first fastener part and the second end is formed by a separate second fastener part. Preferably the elongate fastener is a two-part fastener where the first end is formed by a first fastener part and the second end is formed by a separate second fastener part and the parts are connectable by a screw threaded connection. The first fastener part preferably has a screw threaded portion at one end and a screw threaded projection located at an opposed end. The second is fastener part preferably has a fastener recess to receive the screw threaded projection. The fastener recess preferably has an inner screw threads that is complementary to the screw thread of the screw threaded projection.

The screw threaded nipple preferably has a cylindrical portion with a screw thread and a conical-like portion.

The conical-like portion preferably has a blunt tip.

Preferably the screw threaded nipple has a collar portion between the cylindrical portion and the conical-like portion.

The nipple preferably can be tightened or loosened by use of a screw driver head or an Allen key fitted into a tool recess at its end.

The screw threaded nipple preferably is supported within a nipple housing when the connector assembly is assembled. The nipple housing preferably has a housing cavity surrounded by a substantially cylindrical side wall that has two opposing apertures for accommodating the fastener.

The nipple housing has a base wall in one embodiment and does not have a base wall in another embodiment. In one embodiment, there is a base wall that has an internal housing recess for accommodating the tip of the screw threaded nipple. In another embodiment, there is a base wall with a base aperture for seating the tip of the screw threaded nipple.

Preferably, the inner surface of the side wall has a screw thread. The screw thread of the inner surface can preferably engage the screw thread of the screw threaded nipple.

In another aspect the invention broadly resides in a method of using a connector assembly as described above to connect a first member to a second member, the second member has a preformed cavity and a preformed aperture, the preformed aperture is positioned substantially at 90 degrees to the preformed cavity and opens to the preformed cavity, the method including fixing the first end of the elongate fastener to the first member;

positioning the second end of the elongate fastener in the preformed cavity of the second member wherein the fastener aperture with a countersunk peripheral surface on at least one side surface is aligned with the preformed aperture so that the countersunk peripheral surface is exposed through the preformed aperture and contacted when the nipple is screwed; and a screw threaded nipple that is positionable in the preformed aperture of the second member and locatable in the fastener aperture wherein in use screwing the screw threaded nipple to substantially center the nipple in the fastener aperture, whereby the nipple moves down the countersunk surface to substantially center the nipple in the fastener aperture and the elongate fastener and hence the first member moves closer to the second member.

The method in another embodiment includes the step of positioning the nipple housing in the preformed aperture of the second member whereby the two housing apertures open to the preformed cavity and passing the fastener through the apertures of the housing.

BRIEF DESCRIPTION OF THE DRAWINGS

In order that the present invention can be more readily understood reference will now be made to the accompanying drawings which illustrate preferred embodiments of the invention and wherein.

DETAILED DESCRIPTION OF THE PREFERRED EMBODIMENT

Figure 1:
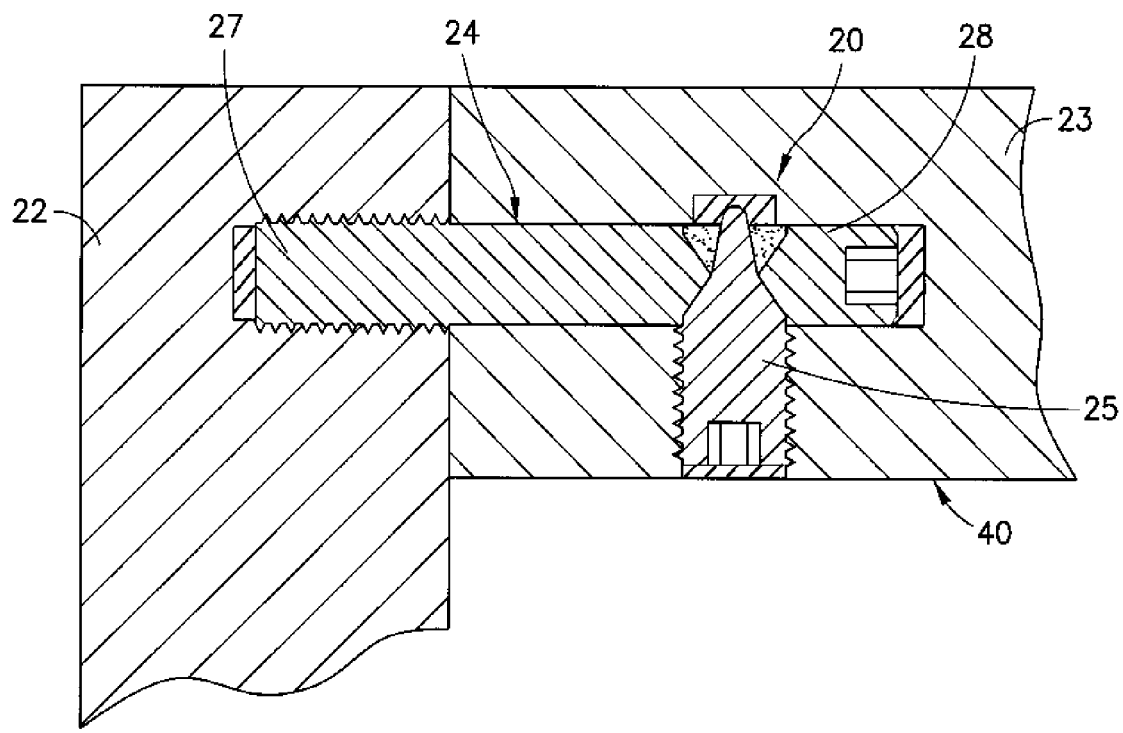
FIG. 1 is a diagrammatic cross-sectional view of a connector assembly for connecting two furniture parts together according to a first embodiment of the invention.
Figure 2:
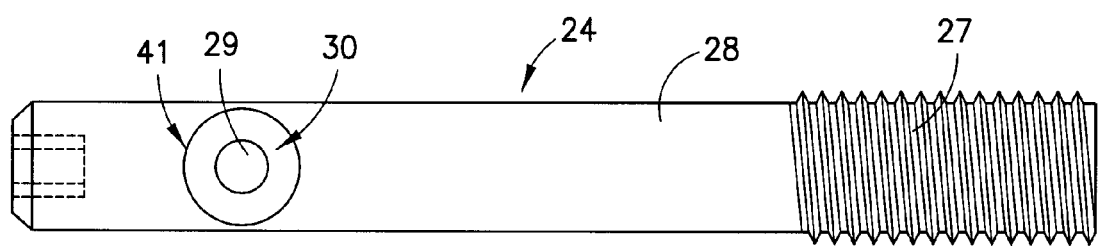
FIG. 2 is a diagrammatic top plan view of a one-part screw threaded fastener of the connector assembly as shown in FIG. 1
Figure 3:
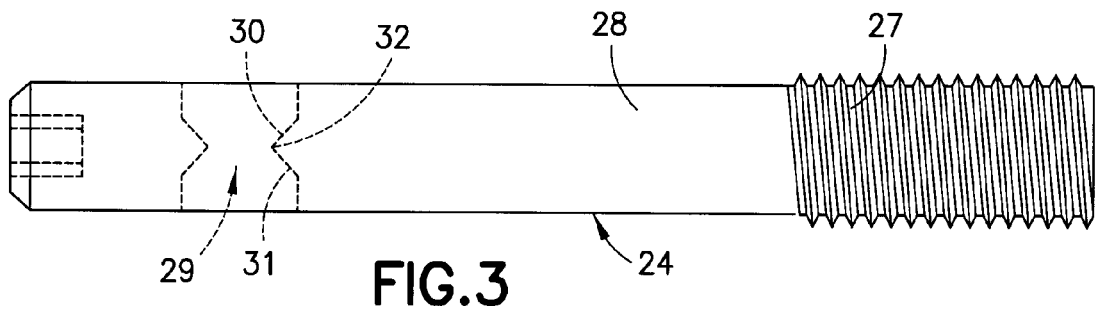
FIG. 3 is a diagrammatic side view of the screw threaded fastener as shown in FIG. 2, where the phantom lines show the side edges of a fastener aperture.
Figures 4A, 4B:
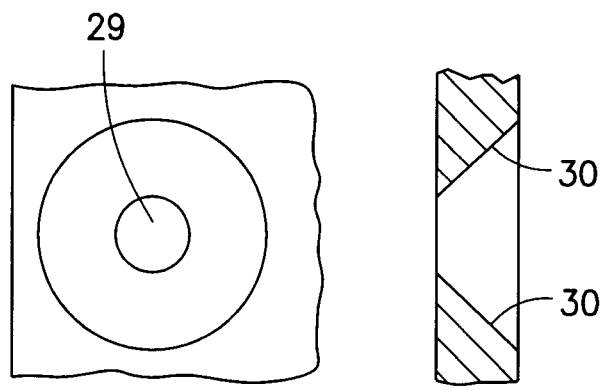
FIG. 4A is a diagrammatic top view of a countersunk surface of the fastener aperture as shown in FIG. 2
FIG. 4B is a diagrammatic part cross-sectional view of the fastener aperture shown in FIG. 4A.
Figure 5:
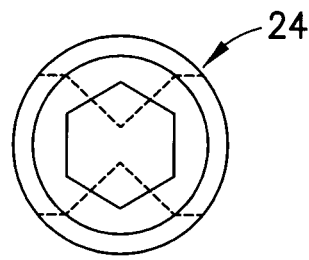
FIG. 5 is a diagrammatic end view of the screw threaded fastener as shown in FIG. 2, where the phantom lines show the side edges of a fastener aperture.
Figure 6:
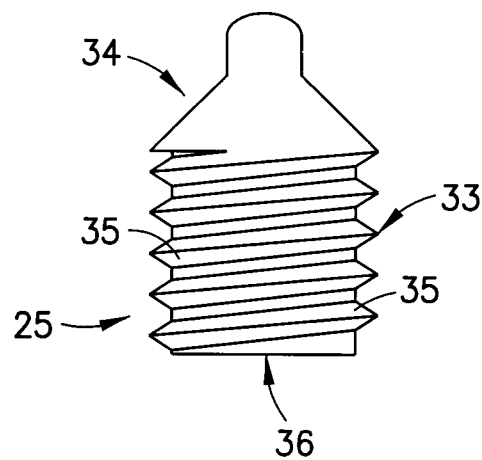
FIG. 6 is a diagrammatic view of a screw threaded nipple of the connector assembly of FIG. 1.

With respect to FIGS. 1 to 7, there is shown a connector assembly 20 for connecting a first furniture part 22 to a second furniture part 23. The connector assembly 20 is a two component connector assembly with a one-part screw threaded fastener 24 and a screw threaded nipple 25.

The screw threaded fastener 24 has a first end portion 27 with screw threads and a second end portion 28 with a fastener aperture 29. The fastener aperture 29 has countersunk peripheral surfaces 30, 31 about the fastener aperture 29 and on opposing sides of the fastener 24. The fastener aperture 29 has a constricted portion 32 formed between the opposing countersunk peripheral surfaces 30, 31.

The screw threaded nipple 25 has a cylindrical portion 33 and a conical-like 15 portion 34. The cylindrical portion 33 has an outer surface with screw threads 35 and a tool recess 36 at the free end of the cylindrical portion 33 to accommodate an Allen key for tightening or loosening the nipple 25.

The interaction between the screw threaded fastener 24 and the screw threaded nipple 25 to connect the first furniture part 22 to the second furniture part 23 will now be described.

The second furniture part 23 has a preformed elongate cavity that can accommodate the second end portion 28 of the screw threaded fastener 24. The second furniture part 23 also has a preformed aperture that can accommodate the screw threaded nipple 25. The preformed aperture is positioned substantially at 90 degrees to the preformed cavity and opens to the preformed cavity.

In order to connect the first furniture part 22 to the second furniture part 23, the first end portion 27 of the screw threaded fastener 24 is fixed to the first furniture part 22 whereas the second end portion 28 is positioned in the preformed cavity. The second end portion 28 is positioned whereby the fastener aperture 29 is aligned with the preformed aperture and the portion of the countersunk peripheral surface 30 distal from the end of the second furniture part 23 is exposed for contact by the screwed nipple 25. The presence of two countersunk peripheral surfaces 30, 31 facilitates alignment as half a turn of the fastener 24 will present and expose a countersunk peripheral surface 30, 31 as described above. With fasteners that have only one countersunk peripheral surface adjustment requires a full turn.

The first furniture part 22 is connected to the second furniture part 23 by screwing the screw threaded nipple 25 into the second furniture part 23 via the 15 preformed aperture. The following steps occur in sequential order when the screw threaded nipple 25 is screwed into the second furniture part 23.

Figure 7A:
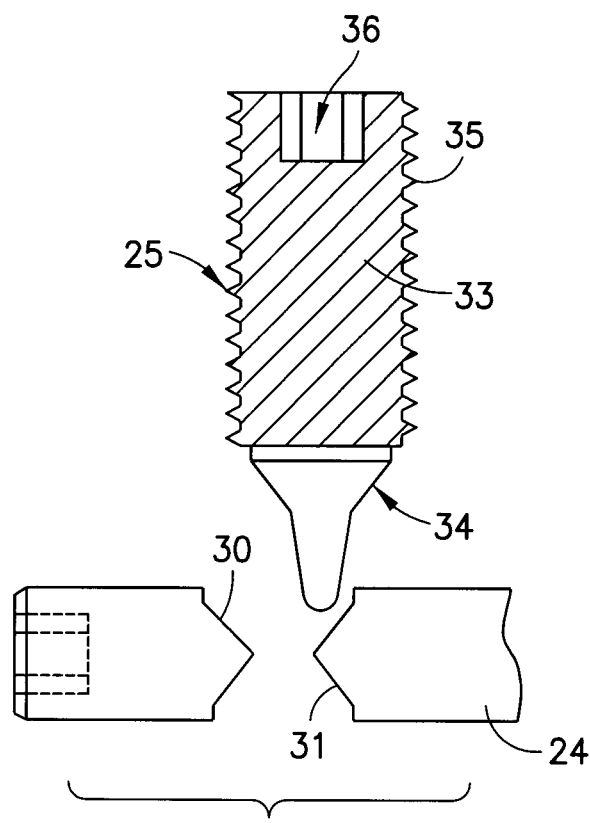
FIG. 7A is a diagrammatic partial view of the connector assembly as shown in FIG. 1 showing the screw threaded nipple positioned on the upper countersunk surface of the screw threaded fastener and FIG. 7B is a diagrammatic partial view of the connector assembly as shown in FIG. 7A showing the screw threaded nipple positioned in the fastener aperture.
Figure 7B:
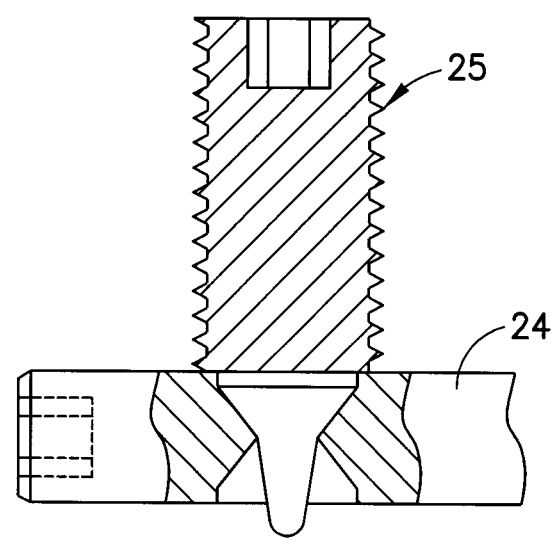

Firstly, the screw threaded nipple 25 is positioned on the upper countersunk surface 30 with the tip of the conical-like portion 34 near an outer edge 41 that is furthermost spaced from the first furniture part 22. This is shown in FIG. 7A. Secondly, the screw threaded nipple 25 is screwed into the second furniture part 23 to substantially center the screw threaded nipple 25 in the fastener aperture 29. This is shown in FIG. 7B.

As the screw threaded nipple 25 is screwed into the second furniture part 23, the position of the tip of the conical-like portion 34 changes from the outer edge 41 of the countersunk surface 30 to the center of the fastener aperture 29.

The downward movement of the nipple 25 moves the fastener 24 fixed to the first furniture part 22 so that the furniture parts 23, 22 move closer. As the screw threaded nipple 25 is screwed into furniture part 23 so that the conical-like portion 34 is substantially in the center of the fastener aperture 29, the furniture parts 22, 23 abut. The tip of the nipple 25 penetrates into the space on the other side of the fastener 24 in the preformed cavity. The nipple is screwed in and is countersunk to provide a neat and aesthetic finish.

Figure 8:
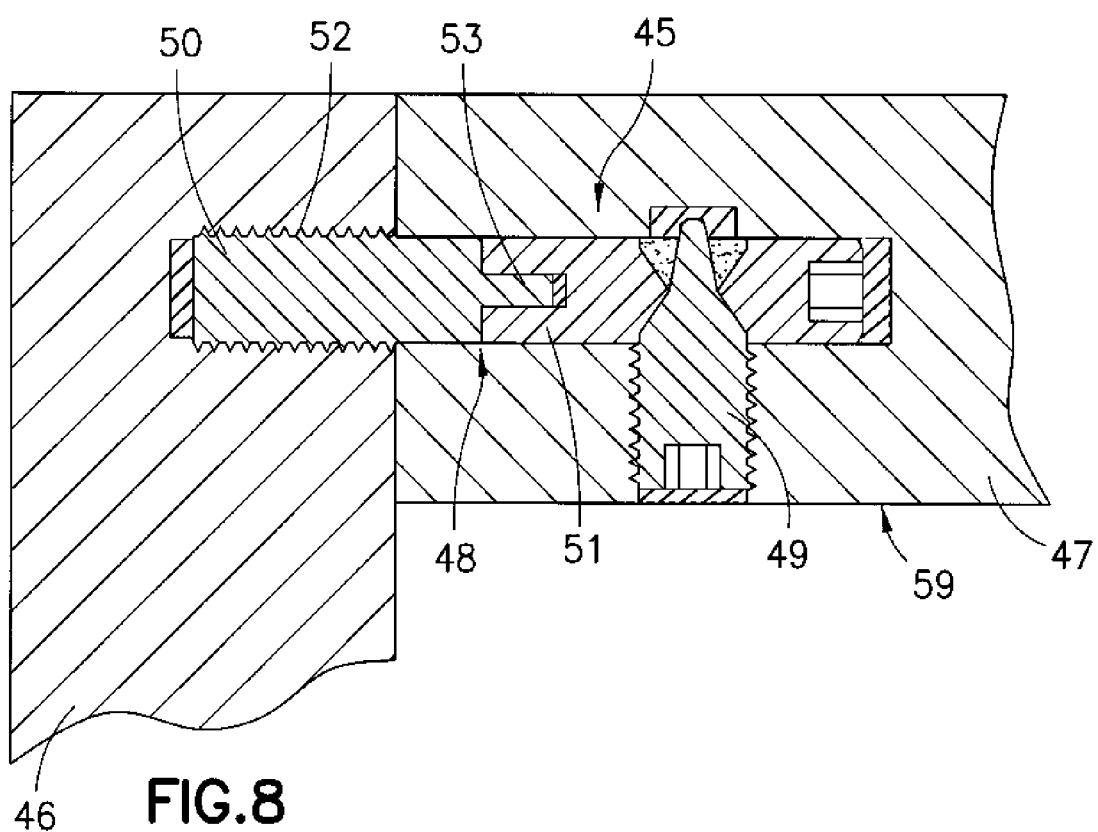
FIG. 8 is a diagrammatic cross-sectional view of a connector assembly for connecting two furniture parts together according to a second embodiment of the invention.
Figure 9:
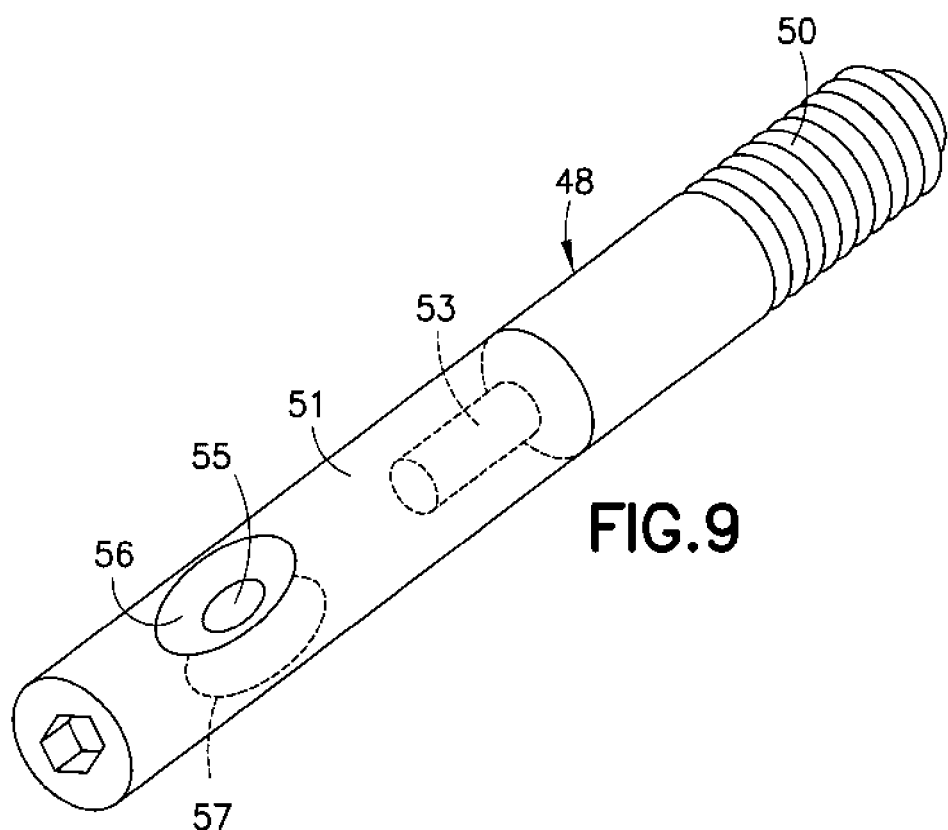
FIG. 9 is a diagrammatic view of a two-part screw threaded fastener of the connector assembly as shown in FIG. 8.

With respect to FIGS. 8 and 9, there is shown a three component connector assembly 45 for connecting a first furniture part 46 to a second furniture part 47. The connector assembly 45 has a two-part screw threaded fastener 48 and a screw threaded nipple 49. The connector assembly 45 is similar to the connector assembly 20 except that the screw threaded fastener 48 has a first fastener part 50 that is separate from a second fastener part 51. The first fastener part 50 has screw threads 52 at one end and a screw threaded projection 53 at an opposed end. The second fastener part 51 has a fastener recess with a complementary screw thread for engaging the screw thread of the screw threaded projection 53. The second fastener part 51 also has a fastener aperture 55 with two countersunk surfaces 56, 57.

The connector assembly 45 can be used to connect a first furniture part 46 and a second furniture part 47 in a way similar to that described above for the connector assembly 20. The difference in connecting the two furniture parts 46, 47 with the connector assembly 45 is that the second fastener part 51 is attached to the first fastener part 50 through the screw threaded projection 53. During the assembling two furniture parts 46, 47 the first fastener part 50 is fixed to the first furniture part 46. The second fastener part 51 is screwed onto the screw threaded projection 53 and positioned in a preformed cavity of the second furniture part 47. The screw threaded projection 53 enables the second fastener part 51 to be rotated about the first fastener part 50. The second fastener part 51 can therefore be conveniently adjusted to align the fastener aperture 55 with the preformed aperture of the second furniture part 47 whereby one of the countersunk surfaces 56, 57 is exposed for contact by the nipple 49.

The screw threaded nipple 49 is fixed to the second furniture part 47 in a manner similar to that described above for the screw threaded nipple 25.

Figure 10:
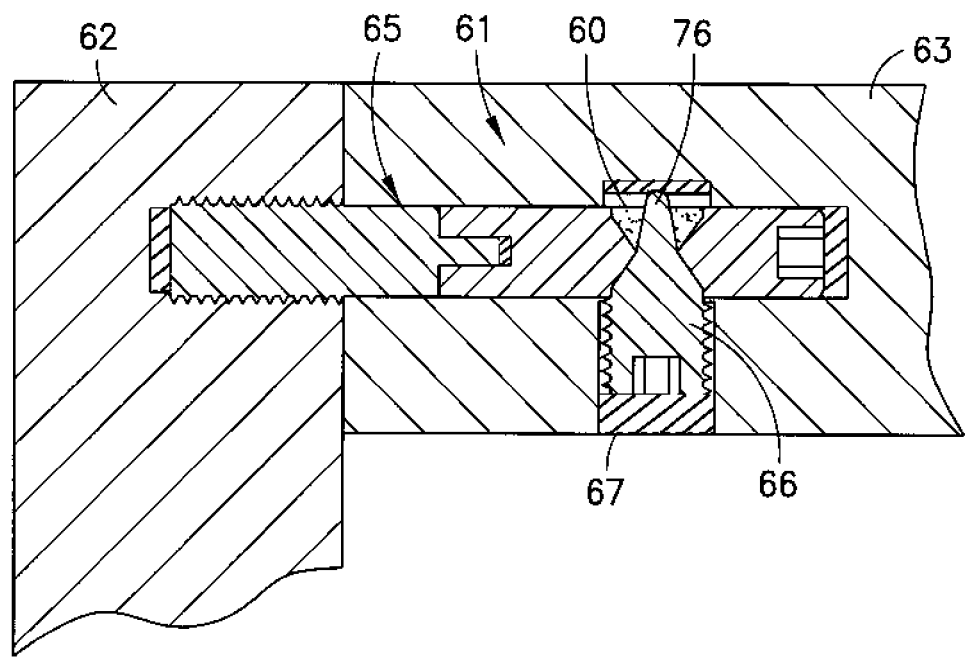
FIG. 10 is a diagrammatic view cross-sectional view of a connector assembly for connecting two furniture parts together according to a third embodiment of the invention.
Figure 11:
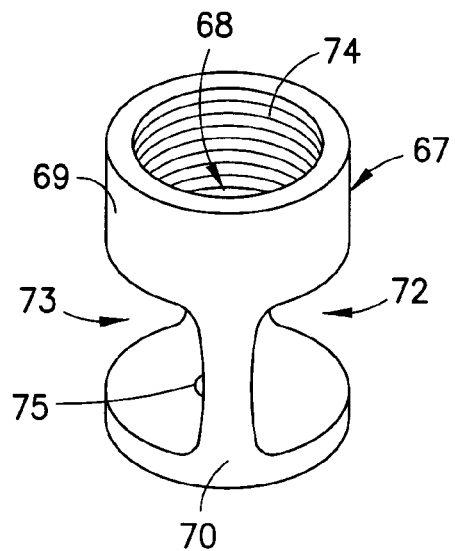
FIG. 11 is a diagrammatic view of a nipple housing of the connector assembly as shown in FIG. 10.
Figure 12:
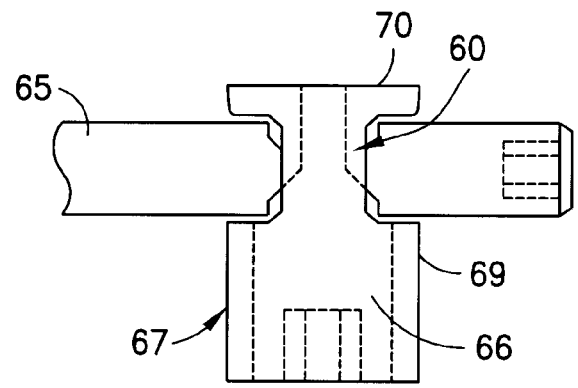
FIG. 12 is a diagrammatic side view of the nipple housing as shown in FIG. 11 showing the screw threaded nipple in phantom lines in the nipple housing.

With respect to FIGS. 10, 11 and 12, there is shown a four component connector assembly 61 for connecting a first furniture part 62 to a second furniture part 63. The connector assembly 61 has a two-part screw threaded fastener 65, a screw threaded nipple 66 and a nipple housing 67. The screw threaded fastener 65 has a fastener aperture 60 with two countersunk peripheral surfaces about the fastener aperture 60. The connector assembly 61 is similar to the connector assembly 45 described above except that the screw threaded nipple 66 is supported within the nipple housing 67 when the connector assembly 61 is assembled.

The nipple housing 67 is cylindrical in shape with an arcuate side wall 69 and a base wall 70. The side wall 69 has two housing apertures 72, 73 on opposed sides of the side wall 69. The inner surface of the side wall 69 has a screw thread 74 that can engage the screw thread of the screw threaded nipple 66. The internal surface of the base wall 70 has a housing recess 75 for accommodating the tip 76 of the screw threaded nipple 66.

The connection of the first furniture part 62 to the second furniture part 63 using the connector assembly 61 involves steps similar to those described above for connector assembly 45. The difference in connecting the two furniture parts 62, 63 with the connector assembly 61 is that the nipple housing 67 is positioned in a preformed aperture of the second furniture part 63 before the screw threaded fastener 65 is positioned in the second furniture part 63. The nipple housing 67 is positioned in the preformed aperture of the second furniture part 63 whereby the two housing apertures 72, 73 open to the preformed cavity. The screw threaded fastener 65 is then positioned and aligned in the preformed cavity of the second furniture part 63. The nipple housing 67 is positioned in the preformed aperture of the second furniture part 63 to enable the screw threaded fastener 65 to pass through the two housing apertures 72, 73 and align the fastener aperture 60 within the housing cavity 68. When the connector assembly 61 is assembled and the two furniture parts 62, 63 are connected to each other, the screw threaded nipple 66 is screwed to the nipple housing 67 and positioned substantially in the center of the fastener aperture 60 of the screw threaded fastener 65. This is shown in FIGS. 10 and 12.

Figure 13:
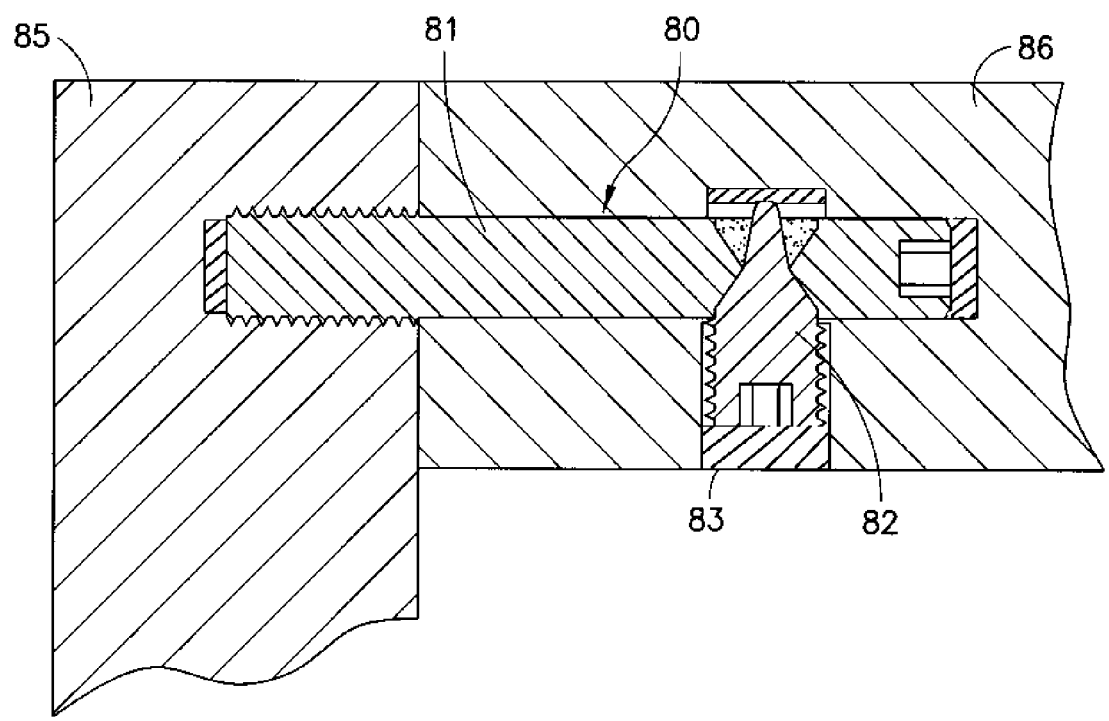
FIG. 13 is a diagrammatic view cross-sectional view of a connector assembly for connecting two furniture parts together according to a fourth embodiment of the invention.

With respect to FIG. 13, there is shown a three component connector assembly 80 for connecting a first furniture part 85 to a second furniture part 86. The connector assembly 80 has a one-part screw threaded fastener 81, a screw threaded nipple 82 and a nipple housing 83. The connector assembly 80 is similar to the connector assembly 61 described above except that the screw threaded fastener 81 is a one-part instead of a two-part screw threaded fastener. The screw threaded fastener 81 is similar to the screw threaded fastener 24 of the connector assembly 20 described above.

The connection of the first furniture part 85 to the second furniture part 86 involves steps similar to those described above for connector assembly 61.

Figure 14:
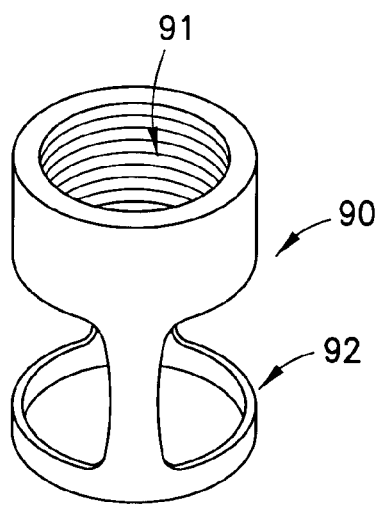
FIG. 14 is a diagrammatic view of an alternate nipple housing that does not have a base wall.

FIG. 14 shows an alternate nipple housing which is similar to those previously described except that there is no base wall. The alternate nipple housing 90 is substantially cylindrical with an internal threaded surface 91 and opposing side wall apertures 92.

Advantages

The advantages of the preferred embodiments of the connector assembly include that they have relatively few parts and provide a tight and aesthetically pleasing finish. The connection formed by the connector assembly has the advantage that it relies on both longitudinal and lateral forces thereby making it difficult to dislodge the connection.

Variations

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims this specification the word "comprise" and variations of that word such as "comprises" and "comprising", are not intended to exclude other additives, components, integers or steps.

The invention claimed is:

1. A connector assembly for connecting a first member to a second member, wherein the second member has a preformed cavity and a preformed aperture, the preformed aperture is positioned substantially at 90 degrees to the preformed cavity and opens to the preformed cavity, the connector assembly including an elongate fastener with a first end fixable to the first member and a second end positionable in the preformed cavity of the second member, the second end has a fastener aperture with opposing countersunk peripheral surfaces and wherein there is a constricted portion formed between the opposing countersunk peripheral surfaces; and a screw-threaded nipple, having a cylindrical portion, a collar portion and a frustoconical portion, wherein the frustoconical portion terminates in a non-threaded blunt tip and wherein the collar portion is between the cylindrical portion and the frustoconical portion, the nipple being positionable in the preformed aperture of the second member and locatable in the fastener aperture wherein in use the second end of the fastener is positioned in the preformed cavity with the fastener aperture, with the countersunk peripheral surface aligned with the preformed aperture so that the countersunk peripheral surface is exposed through the preformed aperture and is contacted when the nipple is screwed and as the nipple moves down the countersunk surface to substantially center the nipple in the fastener aperture and the elongate fastener and hence the first member moves closer to the second member, wherein when the frustoconical portion is seated on the countersink peripheral surface in the fastener aperture, the blunt tip extends through the constricted portion and past an opposing side of the fastener aperture, wherein the elongate fastener is a two-part fastener where the first end is formed by a first fastener part having a screw thread at one end and a screw threaded projection at an opposed end and the second end is formed by a separate second fastener part having a fastener recess with a complementary screw thread for engaging the screw thread of the screw threaded projection.

2. A connector assembly as claimed in claim 1, wherein there is a housing for the positioning of the screw-threaded nipple into the transverse aperture of the fastener, the housing has opposing apertures in the side of the housing to allow the fastener to pass there through.

3. A connector assembly as claimed in claim 1, wherein the fastener is positioned so that a portion of the countersunk peripheral surface that is distal to the first member is exposed through the preformed aperture and is contacted by the nipple when the nipple is screwed into the fastener.

4. A connector assembly as claimed in claim 1, wherein the elongate fastener is a two-part fastener where the first end is formed by a first fastener part and the second end is formed by a separate second fastener part and the parts are connectable by a screw threaded connection.

5. A connector assembly as claimed in claim 1, wherein there is a nipple housing having a substantially cylindrical side wall with two opposing apertures for accommodating the fastener, said nipple housing is positioned in the second member aperture and enables the screw-threaded nipple to screw into the housing and secure the fastener.

6. A connector assembly as claimed in claim 5, wherein the nipple housing has no base wall.

7. A connector assembly for connecting a first member to a second member, wherein the second member has a preformed cavity and a preformed aperture, the preformed aperture is positioned substantially at 90 degrees to the preformed cavity and opens to the preformed cavity, the connector assembly including an elongate fastener with a first end fixable to the first member and a second end positionable in the preformed cavity of the second member, the second end has a fastener aperture with a countersunk peripheral surface and wherein there is a constricted portion formed between the opposing countersunk peripheral surface; and a screw-threaded nipple, having a cylindrical portion, a collar portion and a frustoconical portion, wherein the frustoconical portion terminates in a non-threaded blunt tip and wherein the collar portion is between the cylindrical portion and the frustoconical portion, the nipple being positionable in the preformed aperture of the second member and locatable in the fastener aperture wherein in use the second end of the fastener is positioned in the preformed cavity with the fastener aperture, with the countersunk peripheral surface aligned with the preformed aperture so that the countersunk peripheral surface is exposed through the preformed aperture and is contacted when the nipple is screwed and as the nipple moves down the countersunk surface to substantially center the nipple in the fastener aperture and the elongate fastener and hence the first member moves closer to the second member, wherein when the frustoconical portion is seated on the countersink peripheral surface in the fastener aperture, the blunt tip extends through the constricted portion and pasted an opposing side of the fastener aperture, wherein the elongate fastener is a one part fastener where the first end is formed by a first fastener part having a screw thread at one end and a screw threaded projection at an opposed end and the second end is formed by a separate second fastener part having a fastner recess with a complementary screw thread for engaging the screw thread of the screw threaded projection.

8. A connector assembly for connecting a first member to a second member, wherein the second member has a preformed cavity and a preformed aperture, the preformed aperture is positioned substantially at 90 degrees to the preformed cavity and opens to the preformed cavity, the connector assembly including an elongate fastener with a first end fixable to the first member and a second end positionable in the preformed cavity of the second member, the second end has a fastener aperture with as countersunk peripheral surface on at least one side; and a screw-threaded nipple, having a cylindrical portion, a collar portion and a frustoconical portion, wherein the frustoconieal portion terminates in a non-threaded blunt tip and wherein the collar portion is between the cylindrical portion and the frustoconical portion, the nipple being positionable in the preformed aperture of the second member and locatable in the fastener aperture wherein in use. the second end of the fastener is positioned in the preformed cavity with the fastener aperture, with the countersunk peripheral surface aligned with the preformed aperture so that the countersunk peripheral surface is exposed through the preformed aperture and is contacted when the nipple is screwed and as the nipple moves down the countersunk surface to substantially center the nipple in the fastener aperture and the elongate fastener and hence the first member moves closer to the second member, wherein when the frustoconical portion is seated on the countersunk peripheral surface in the fastener aperture, the blunt tip extends through a constricted portion formed between opposing countersunk peripheral surfaces of the second end of the elongate fastener and past an opposing side of the fastener aperture, wherein the elongate fastener is a one-part fastener where the first end is integrally formed with the second end.

* * * * *